(12) United States Patent
Hoffmann et al.

(10) Patent No.: US 7,539,177 B2
(45) Date of Patent: May 26, 2009

(54) CALL HOLD/TERMINAL PORTABILITY IN H.323/ISUP-BICC-SIP NETWORKS

(75) Inventors: Klaus Hoffmann, München (DE); Joachim Lüken, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 939 days.

(21) Appl. No.: 10/510,975

(22) PCT Filed: Apr. 1, 2003

(86) PCT No.: PCT/DE03/01074

§ 371 (c)(1),
(2), (4) Date: Oct. 8, 2004

(87) PCT Pub. No.: WO03/088685

PCT Pub. Date: Oct. 23, 2003

(65) Prior Publication Data

US 2005/0157701 A1    Jul. 21, 2005

(30) Foreign Application Priority Data

Apr. 11, 2002 (DE) .......... 102 15 974
Apr. 12, 2002 (DE) .......... 102 16 282
Jul. 19, 2002 (DE) .......... 102 32 943

(51) Int. Cl.
*H04L 12/50* (2006.01)

(52) U.S. Cl. .......... 370/352; 370/401; 370/466

(58) Field of Classification Search .......... 370/401, 370/359, 465, 402, 352, 466
See application file for complete search history.

(56) References Cited

U.S. PATENT DOCUMENTS

2001/0030968 A1* 10/2001 Hallenstal et al. .......... 370/395
2003/0227908 A1* 12/2003 Scoggins et al. .......... 370/352

FOREIGN PATENT DOCUMENTS

WO    WO 01/84790 A    11/2001

* cited by examiner

*Primary Examiner*—Ricky Ngo
*Assistant Examiner*—David Oveissi
(74) *Attorney, Agent, or Firm*—Laurence A. Greenberg; Ralph E. Locher; Werner H. Stemer (57) ABSTRACT

The invention relates to an interworking between two protocols in a network with a first user, corresponding to the first protocol and a second user corresponding to the second protocol, achieved whereby a third protocol serves as interface between the Media Gateway Controllers (MGC) involved. A connection between the both users is achieved by means of at least one user channel in each of the transmission and receive directions. Performance features, the operation of which provide a resolution of the user channels, which, on initiation of the performance features, are provided with a command set directed at the second user by the first user with the aim of interrupting the user channel coming from the second user with respect to the first user.

21 Claims, 5 Drawing Sheets

Prior art

FIG 5B

CALL HOLD/TERMINAL PORTABILITY IN H.323/ISUP-BICC-SIP NETWORKS

CROSS REFERENCE TO RELATED APPLICATIONS

This application is the US National Stage of International Application No. PCT/DE03/01074, filed Apr. 1, 2003 and claims the benefit thereof. The International Application claims the benefits of German applications No. 10215974.2 filed Apr. 11, 2002, No. 10216282.4 filed Apr. 12, 2002, and No. 10232943.5 filed Jul. 19, 2002, all of the applications are incorporated by reference herein in their entirety.

FIELD OF INVENTION

The invention relates to telecommunications networks, preferably multimedia digital networks of Internet telephony, in which subscribers with devices from different manufacturers and with different functionality can exchange data with each other using various protocols or different protocol families.

BACKGROUND OF INVENTION

With Internet telephony the terminals of the subscribers establish a connection (Internet Protocol connection) to the device of the partner subscriber and send the voice data as encoded packets over the Internet.

So that the network can set up, monitor and end connections it is necessary to exchange signaling data as well as subscriber or payload data. Basically a distinction is made here between a signaling channel intended to be used for transmission of the above signaling data and a user channel, also referred to as bearer or medium.

There are two signaling models: One is Channel Associated Signaling, CAS, also called inband signaling, in which the signaling data is transmitted over the same network as the payload data and the other is Common Channel Signaling, CCS, also called outband signaling, in which the signaling data is transmitted over a separate network. The advantage of this is that the signaling channel can be optimized in respect of data transmission to provide a higher data transmission rate overall. Signaling information can also be exchanged during an existing session or connection.

SUMMARY OF INVENTION

The present invention relates to CCS systems, in which preferably at least one of the user channels and the separate signaling channel are based on IP networks.

In the access network there is a channel which controls the transmission channels. The ISDN basic access for example offers two radio channels, via which payload data can be exchanged at a transmission rate of 64 kbit/s and a D-channel for control, which sends signaling data at a data transmission rate of 16 kbit/s.

A number of models or protocols for "Voice-over-IP" networks have been developed by the ITU-T (International Telecommunications Union, Group telecommunications network) and the Internet Engineering Task Force (IETF), some of which are in competition with each other.

The ITU-T defines in the H.323 Recommendation the underlying standard for the transport of voice, data and video streams over a network. H.323 uses RTP/RTCP as bearer protocol for audio and video streams and H.225 as protocol for call control, which includes the signaling, registration and synchronization of media streams.

H.323 mainly provides for the following devices:
a terminal, which functions as a terminal in a Local Area Network (referred to as a LAN in this document) which is arranged for two-way communication with other terminals in real time;
a gateway or media gateway (abbreviated to MG in this document), which processes and if necessary forwards voice content,
a gatekeeper used for call control or a
Media Gateway Controller (abbreviated to MGC), which offers the subscriber the IN services.

Basically at least two subscribers communicate via terminals which are designed for two-way communication in real time. The gateways involved can in this case be controlled via the Media Gateway Controllers assigned to them.

These gateways and gateway controllers can also be arranged between different packet-oriented data networks, in which for example the protocols of the SIP family or those of the H.323 family are used.

For network control in Voice-Over-IP (abbreviated to VoIP) networks there are a number of alternate standards. This means that for communication between MG and MGC the Media Gateway Control Protocol (MGCP) can be used or alternatively MEGACO or the H.248 protocol or protocols which operate in a similar way.

In the MGCP concept developed by the IETF the central intelligence of the network lies with the MGC. All state transitions are notified to the MGC through a series of relatively simple commands and the MG can if necessary execute actions at the command of the MGC.

With its Session Initiation Protocol (referred to hereafter as SIP) the IETF discloses an alternate standard to H.323 for Internet telephony and therefore presents a tool for providing an interactive connection over the Internet. At user level the H.323 protocol is replaced by the SIP here. SIP supports the control of a connection and the translation of SIP addresses into IP addresses. SIP on the other hand is based on relatively intelligent network endpoints which take over the signaling task themselves. A proxy server is then used for a call setup if the connected endpoints do not know each other. It can be arranged to forward a received request for a client, e.g. an IP telephone, a PC or a PDA, after evaluating and modifying it.

By contrast with Internet telephony, the conventional telephone system is a circuit switched network (Public Switched Telephony Network, PSTN), which is based on communication via switching centers.

So that not only IP-based devices and PSTN-compatible devices can now communicate with each other it is necessary, on the one hand for IP telephones to be able to interwork (even if they are operating with different protocols, for example the interworking of H.323 and SIP in the invention) and on the other hand for IP telephones to be able to interwork with circuit switched devices (as for example the interworking of PSTN and SIP in the invention).

To guarantee the most complex area of use and the smoothest operation possible, interworking between the relevant protocols (SIP and H.323 and where necessary protocols which are used in PSTN networks, such as ISUP, ISDN User Part) with functionality which remains at the same level where possible is needed.

From the subscriber's standpoint the decisive factor is the functionality of the terminal and thereby the service features that it provides which they can access. Typical examples of features are: Call Waiting, speakerphone, number redial, disconnection, transfer, forwarding etc.

With these features a distinction can be made between two classes: 1. Service features which require the disconnection of the payload channel and 2. those which do not require disconnection.

The invention relates to service features in the first class, preferably the features "Call Hold" and "Terminal Portability", which allow a timed interruption of an existing connection, where necessary with interruption of the payload stream.

A disconnection of the payload channel or of the payload channels is undertaken locally with conventional PSTN networks, that is in the switching center of the subscriber who has requested the service feature.

In SIP-IP-based networks a disconnection of the payload channel is only partly provided locally, namely for the own transmit direction.

Therefore the service features which require complete disconnection of the payload channel (i.e. in send and receive direction) cannot yet be executed for an SIP subscriber in interworking with PSTN and/or H.323 and BICC.

The object of the present invention is thus to make possible a method for Interworking between of a first protocol (SIP) and of a second protocol (H.323 or PSTN), where the first protocol (SIP) is used in packet-oriented networks (IP networks). This should if necessary be guaranteed in the Interworking with a third protocol (BICC) on which the signaling is based and the function is arranged between the first and the second protocol.

Furthermore it is desirable to provide the subscriber with as many service features as possible, preferably to make available service features to a group of first subscribers which operate in accordance with the first protocol (SIP) to which subscribers in PSTN networks can have access and which require a disconnection of the payload channels in interworking of H.323 or PSTN and BICC.

This object is achieved by interworking between a number of protocols, preferably a first protocol with which a first subscriber operates and a second protocol with which a second subscriber operates of a digital, multimedia communications network in which a connection between two or more subscribers includes at least one payload channel in the send and receive direction, in which the first protocol is designed for signaling in packet-oriented or IP-based networks and, for service features which require a disconnection of the payload channel, only provides a local disconnection of the relevant payload channel in the send direction and in which the second protocol provides for service features which require a disconnection of the payload channel at least optionally a local disconnection of the relevant payload channel in the send direction and for which the first subscriber is also provided with a set of service features, preferably such service features as require a disconnection of the relevant payload channel in the send and the receive direction, where the second protocol is expanded by a set of commands for non-local disconnection of the relevant payload channel in the receive direction in respect of the first subscriber or in that the second subscriber is controlled in a modified way in as far as sending in the direction of the first subscriber, preferably sending of a media stream, is interrupted.

Furthermore this object is achieved by a device, preferably a protocol converter and an arrangement, preferably a network system, especially a multimedia communications network system designed to achieve this object.

The first preferred embodiment of the invention relates to interworking between the SIP protocol as the first protocol for signaling in IP-based networks and the BICC or ISUP+ as a further protocol via which the connection to the second subscriber is established who for example can be an analog subscriber in a PSTN network or an ISDN network.

The second preferred exemplary embodiment of the invention relates to interworking between at the SIP protocol as a first protocol for signaling in the IP-based networks and the H.323 as a second protocol which is also arranged for signaling in the said IP networks. In this embodiment both subscribers are then in the IP area.

In both preferred embodiments interworking between the two protocols given is indirect. that is by access to a further, third protocol, preferably the BICC (Bearer Independent Call Control). Alternative embodiments to the two embodiments given above however provide for the arranging a direct interworking, that is directly and without the use of BICC.

The method in accordance with the invention also covers a combination of the two embodiments so that interworking of SIP on at the one hand and H.323 and ISUP on the other hand occurs using BICC.

The invention relates in general terms to interworking of PSTN-based protocols (e.g. ISUP in the first embodiment) or (in the second embodiment) the H.323 protocol family, which also includes in particular the protocols H.225, H.248 and H.450, with interworking to the protocol SIP and preferably BICC.

Communication between the Media Gateway Controllers and thereby also interworking between the protocols is preferably undertaken using the third protocol, BICC CS2 (bearer independent call control capability Set 2).

ISUP+ can be used here as an alternative to BICC. In accordance with invention this makes possible interworking between the protocols SIP, H.323 or ISUP, ISUP+ or BICC.

Since with the first embodiment the relevant subscriber can belong to different network types (IP and PSTN) Media Gateways are used as intermediaries. This is not necessary with the second embodiment of the invention since both subscribers belong to the IP network here.

In the first case communication between the MGC and the MG is preferably via the MGCP protocol. As an alternative to the Media Gateway Control protocol the H.248 protocol or a protocol which operates in the same way can be provided here.

In the preferred embodiment hiG1000 is used as MG and hiQ9200as MGC.

Further advantages, features and alternate embodiments of the invention are to be found in the detailed description of the figures below which are to be read in combination with the drawing.

BRIEF DESCRIPTION OF THE DRAWINGS

FIG. 2 shows the elements shown in FIG. 1 expanded by additional SIP interworking in accordance with invention, FIG. 3 commands in accordance with the invention between a first SIP subscriber and a second PSTN subscriber and the network elements between the two, FIG. 4 commands in accordance with invention between a first SIP subscriber and a second for H.323 subscriber and the network elements between the two and FIG. 5a a schematic illustration of a disconnection of a payload channel in the send and receive direction in accordance with the prior art when two PSTN subscribers are communicating and one initiates a service feature in relation to the other subscriber FIG. 5b a schematic illustration of the disconnection of the payload channel in the send and receive direction in accordance with the invention when an SIP subscriber initiates the service feature in respect of an H.323 subscriber or of a PSTN subscriber

DETAILED DESCRIPTION OF INVENTION

Figure 1:
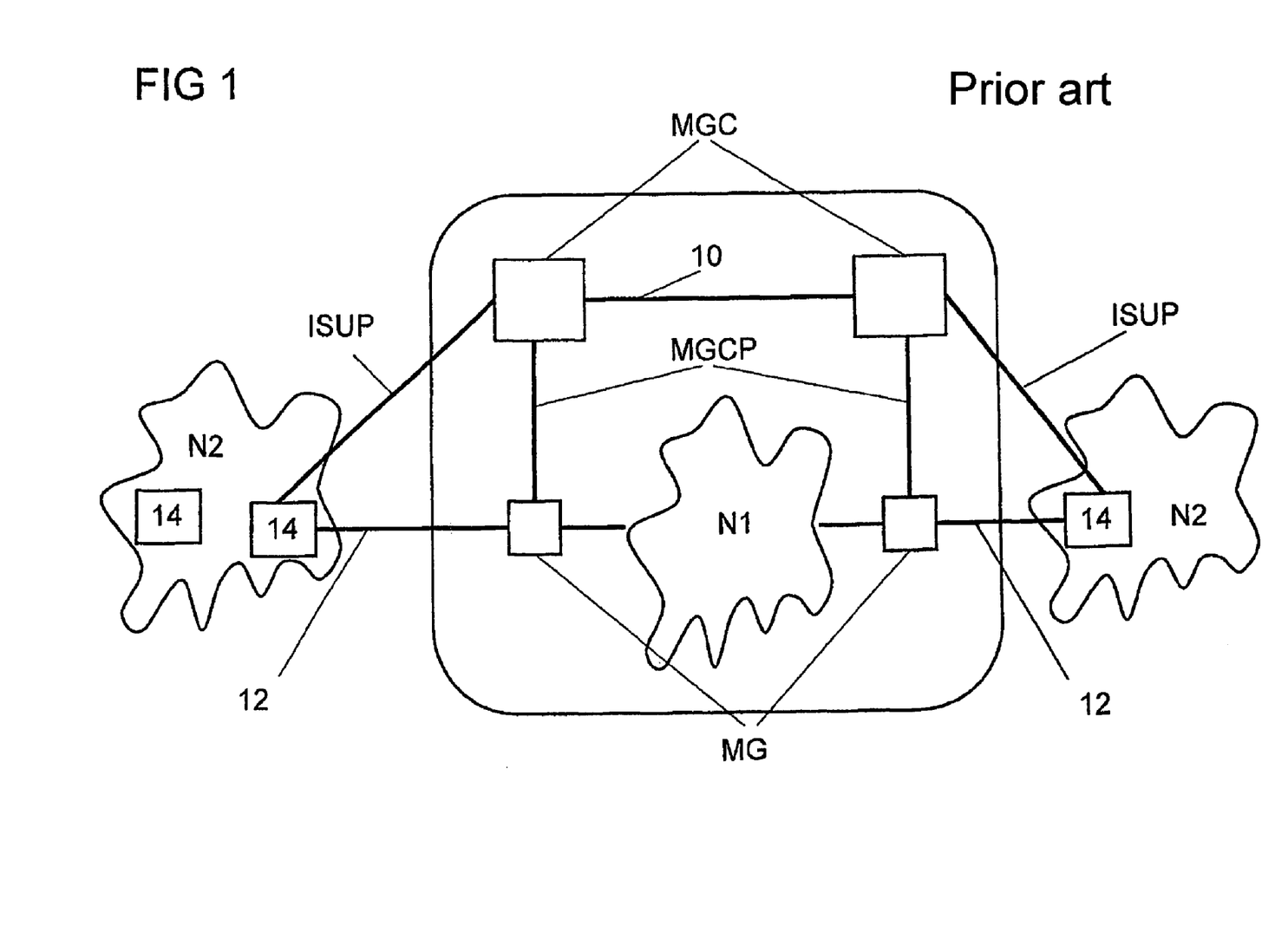
FIG. 1 shows a schematic illustration of a known VoIP communication between a PSTN and an IP network.

FIG. 1 shows the basic scenario known from the prior art of a VoIP communication and of outband signaling, in which a signaling channel 10 is disconnected from the payload channel 12.

Subscribers of a PSTN network N2 are connected via the relevant terminals 14 at two other subscribers via a payload channel 12 who are routed or transferred via a packet-oriented network, preferably the Internet N1.

PSTN networks the ISUP is preferably used for outband signaling. However other protocols which operate in a similar way, preferably the TUP (Telephone User Part) and similar can be used.

With IP networks if, as in the second embodiment of the invention, both subscribers belong to the IP network, signaling occurs via a Media Gateway Controller MGC, where the Media Gateway Controllers MGC communicate with each other using a BICC CS2 protocol or an ISUP+ protocol.

The interface between the Media Gateway Controller MGC and a Media Gateway MG assigned to it is via a Media Gateway Control Protocol MGCP or via a protocol in accordance with the H.248 Standard.

Media Gateways MG function as the interface between the PSTN network N2 or its trunk lines and the IP network N1.

With networks such as the conventional PSTN networks N2, which are based on time Division multiplexing (abbreviation: TDM) it is known that a connection between two subscribers is temporally interrupted so that it can be restored at a later point. Such service features 16 requires both directions (send and receive direction) of the payload channel 12 of the connection to be able to be interrupted and for this interruption to be able to be processed by the call control system.

With PSTN networks N2 such an interruption of both directions is executed by a local switching center 18 of the subscriber who has requested this service feature 16. Other networks which operate in accordance with other protocols, such as for example a Session Initiation Protocol (abbreviation: SIP), only support one interruption of the own send direction. The result of this is that, in accordance with the method from the prior art, access to such service features 18 was not possible in an SIP-based network. However this problem is resolved by the method in accordance with the invention.

Figure 2:
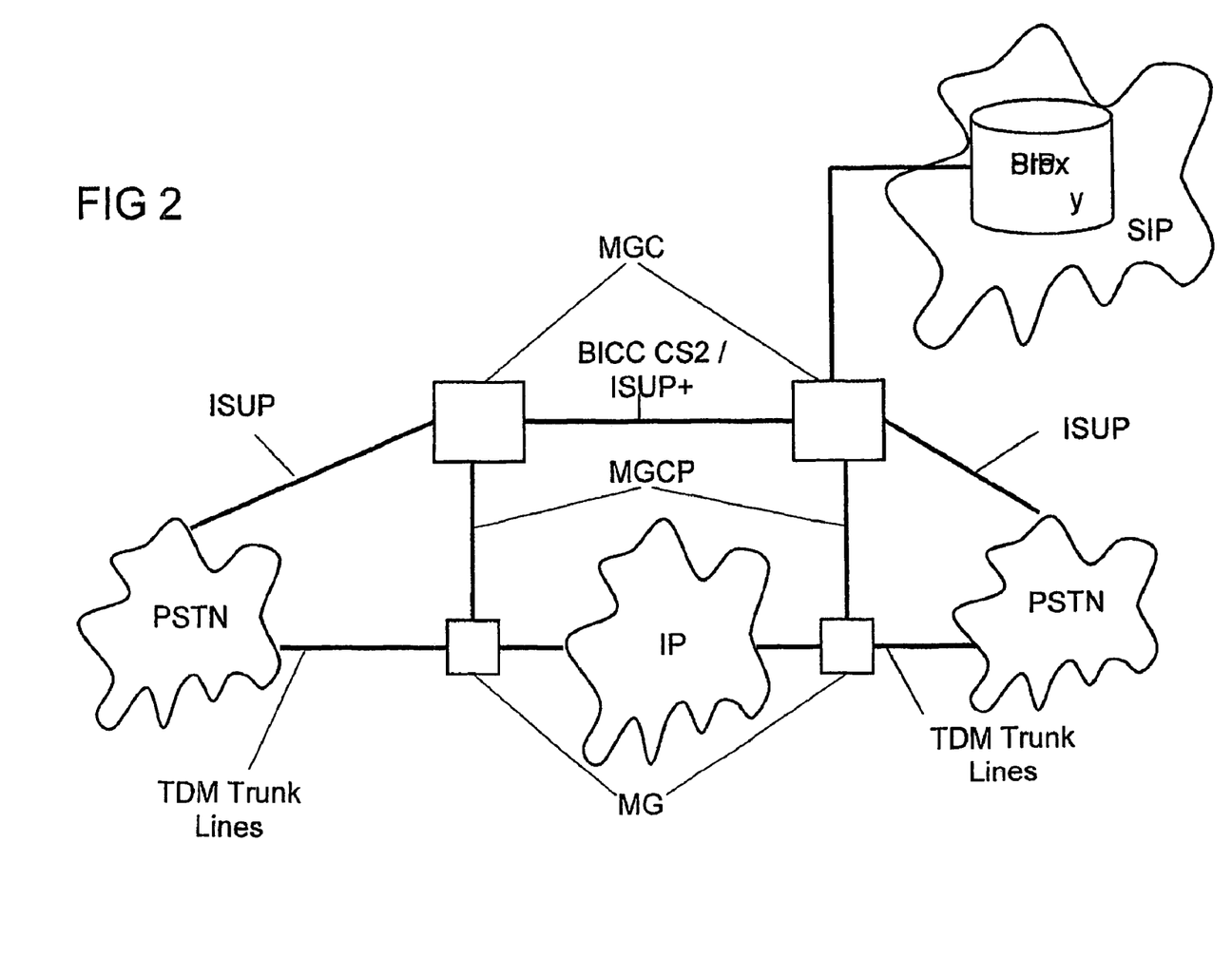

Thus FIG. 2 shows the basic interaction with an SIP-based network N1 which expands the scenarios just described by a further SIP interworking so that its overall an exchange is undertaken between the protocols SIP, ISUP and BICC.

Figure 5A:
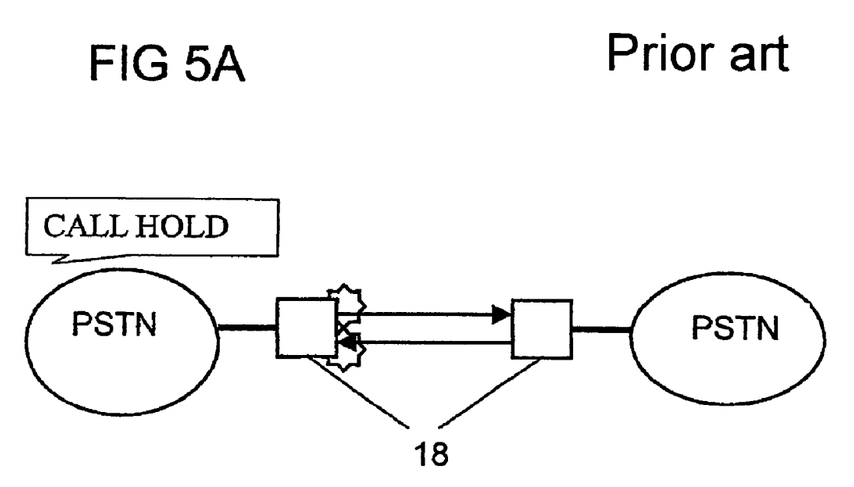

FIG. 5a shows schematically how or where a disconnection of the payload channels involved 12 occurs in an ISDN N2 network known from the prior art: namely completely (i.e. for both directions) at the switching center 18 of the subscriber who has initiated or requested the service feature 16. This however requires that both subscribers belong to the PSTN network.

This method is not possible if a first subscriber, an SIP subscriber T1 is connected to another subscriber and would like to initiate this service feature 18 since the SIP protocol P1 only allows a local interruption of the own send channel (i.e. only one direction).

For an H.323 subscriber as well in the corresponding standard (ITU-T Standard H.450.4 Section 5.1) such a feature for interworking with SIP has not previously been taken into account and is therefore not available. A local interruption has required by the service features 16 in accordance with the invention (so that especially the sending of the payload stream to the remote partner can be suppressed) is previously provided only optionally for the H.323 side. SIP however requires an unconditional interruption.

In accordance with a first embodiment of the invention, an SIP subscriber T1 communicates with a PSTN subscriber T2.

Figure 3:
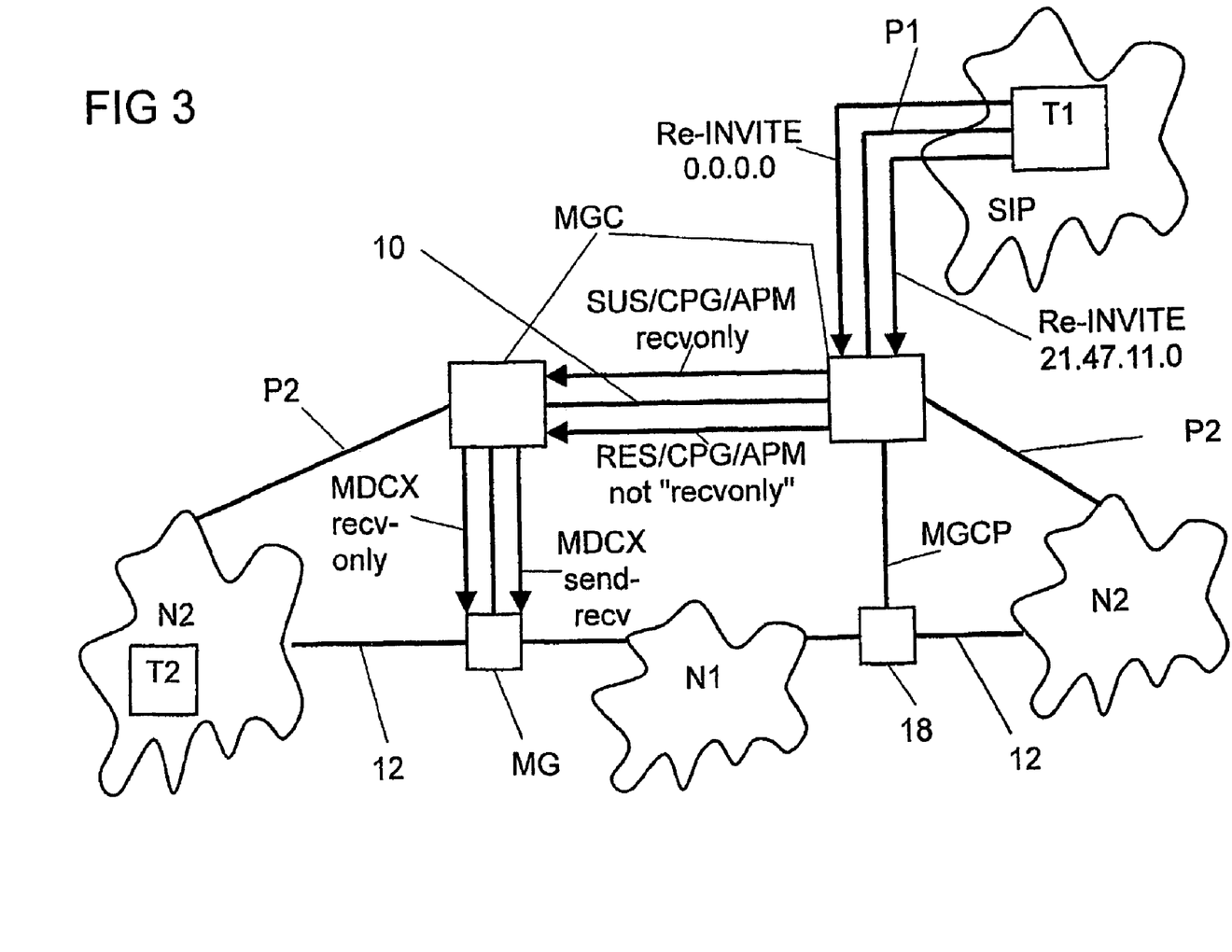

With reference to FIG. 3 the basic call control in accordance with the invention is explained below in the case of interworking between an A-side TDM subscriber T2 and a B-side SIP subscriber T1, where the TDM service feature 16 "Call Hold" or "Terminal portability" is to be used by the B-side SIP subscriber T1. Generally the calling subscriber is identified as A and the called subscriber as B.

However there is no restriction as regards the assignment of the A and B-side for the use of the invention, so that the device or method in accordance with the invention can be used for A- and B-side users.

For this purpose for example the SIP application in the B-side terminal 14, in accordance with the prior art, sends a re-INVITE to the remote partner subscriber T2 with the IP address at 0.0.0.0 (or the remote terminal 14 is controlled in a modified way, in accordance with new information elements or attributes or mode parameters, see also IETF draft 2543 to -04 Chapter B.4.4 or Draft ietfmmusic-sdp-offer-answer-02 Chapter 8.4.). At the interworking point of BICC to SIP the value of the IP address 0.0.0.0 preferably in a new value of the Action Indicator in the BAT APP (the term "Action indicator" identifies an information element in the BICC to signal actions to be executed for MGC-MGC communication with the aid of BICC to a remote Media Gateway Controller MGC; the term "BAT" is an abbreviation for the bearer application protocol of ITU-T Q.765.5 and the term "APP" is an abbreviation for the Application Transport Parameter of ITU-T Q.765), which tells the remote Media Gateway Controller MGC that for this connection sending of payload in the direction of the B-subscriber T1 is temporarily not allowed In this case the APP may be sent in a BICC SUS/RES (suspend/resume command from the ISUP), or CPG(Hold)/CPG(retrieve) (CPG: call progress from the ISUP). In addition the APP can be sent in an independent APM (APM: Application Transport message ITU-T Q.765) where it should be noted that this can possibly lead to a desynchronization. After its receipt the A-side Media Gateway Controller MGC uses the Media Gateway Control Protocols MGCP to cause the A-side Media Gateway MG e.g. with the aid of the Connection Mode Parameters "recvonly" (receive only), to prevent any more media stream being sent to the B-side SIP subscriber T1.

When the B-side SIP subscriber T1 now wishes to accept the A-side TDM subscriber T2 again, the SIP application again transmits its own IP address (or alternatively the information elements or attributes used). From this an Action Indicator is again made in the BICC which allows the sending of payload from A to B. In this case the APP may be sent in a BICC SUS/RES, or CPG(Hold)CPG(retrieve) or in addition in a self-contained APM (see above, if nec. duplication of the message in successive interworkings BICC-SIP etc). Then the Media Gateway MG is set again with the connection mode "sendrecv" so that the subscriber T1 hears the subscriber T2 again.

For the case where the feature is to be initiated by the A-side TDM subscriber T2 no particular actions are necessary, since the payload stream is interrupted in the PSTN switching center 18.

The scenario depicted is only one example. Basically the other direction (A-side SIP subscriber T1 sends re-INVITE) is allowed.

In accordance with a second embodiment of the invention an SIP subscriber T1 communicates with an H.323 subscriber T2. This scenario is shown in FIG. 4.

In accordance with the invention the remote H.323 subscriber will either be controlled via BICC in accordance with the modified method or the (dependent) H.323 subscriber actually interrupts the sending of his payload in the direction of the SIP subscriber when the latter receives the information element defined in H.450.4.

This is achieved by the protocol expanded by the new value of the Action Indicator(the expanded protocol relates to the present explanations as regards the first embodiment of the invention, for with, as regards communication between SIP and PSTN the protocol interacting with the SIP protocol was expanded, in order to also provide the SIP subscriber with the service features 16 "Call Hold/Terminal Portability") being mapped in accordance with the second embodiment of the present invention to the new H.225 information elements.

Figure 4:
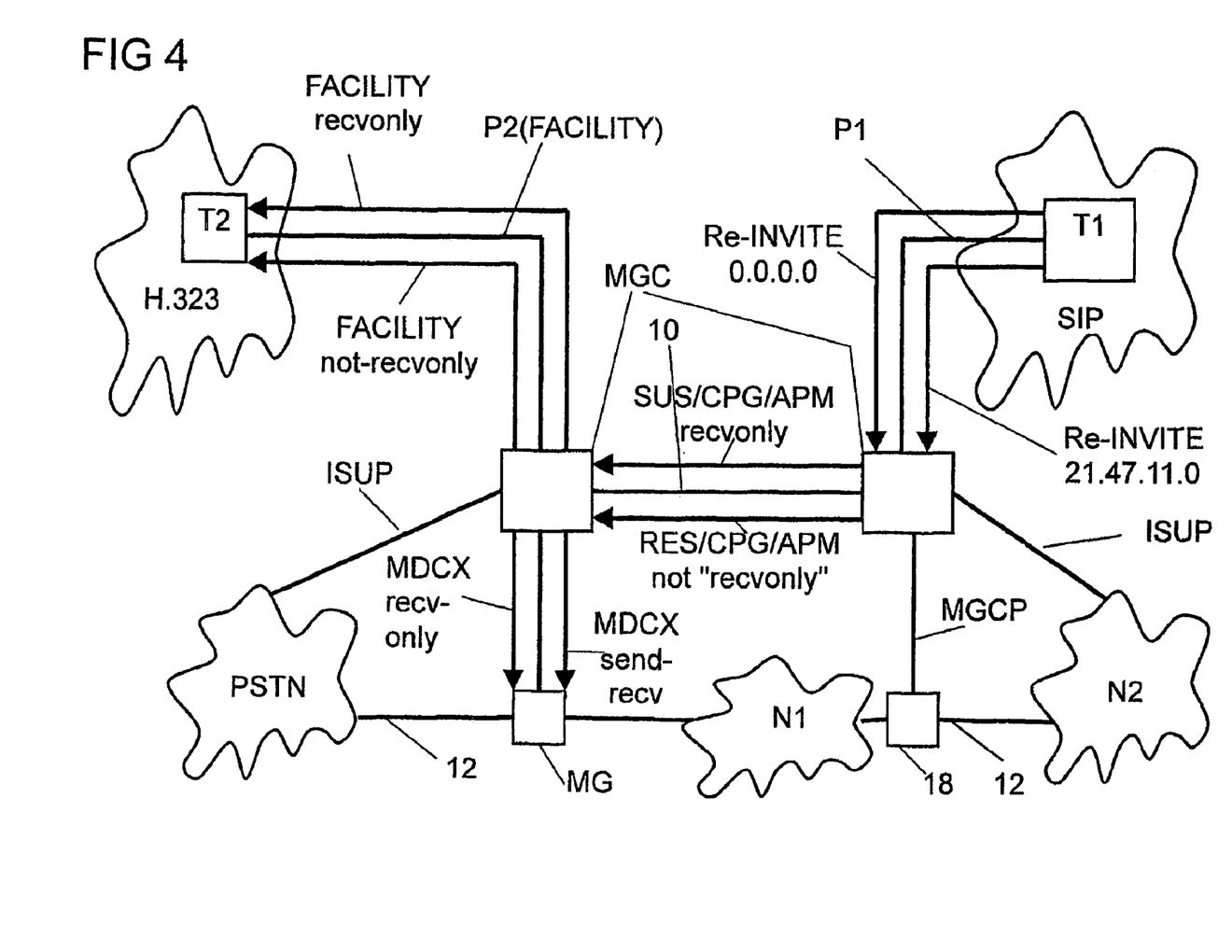

With reference to FIG. 4 the basic call control of the second embodiment is explained below (Interworking H.323/SIP) in the case of interworking between an A-side SIP subscriber T1 and a B-side H.323 subscriber T2, where the TDM service feature 16 "Call Hold" or "Terminal portability" is to be used by the B-side SIP subscriber T1. Generally the calling subscriber is identified as A and the called subscriber as B. However there is no restriction as regards the assignment of the A and B-side for the use of the invention, so that the device or method in accordance with the invention can be used for A- and B-side users.

To this end for example the SIP application in the B-side terminal 14 in accordance with the prior art, sends a re-INVITE to the remote partner subscriber T2 with the IP address at 0.0.0.0 (or alternatively the new attributes). At the interworking point of BICC to SIP the value of the IP address 0.0.0.0 preferably in a new value of the Action Indicator in the BAT APP (the term "Action indicator" identifies an information element in the BICC to signal actions to be executed for MGC-MGC communication with the aid of BICC to a remote Media Gateway Controller MGC; the term "BAT" is an abbreviation for the bearer application protocol of ITU-T Q.765.5 and the term "APP" is an abbreviation for the Application Transport Parameter of ITU-T Q.765), which tells the remote Media Gateway Controller MGC that for this connection sending of payload in the direction of the B-subscriber T1 is temporarily not allowed In this case the APP may be sent in a BICC SUS/RES (suspend/resume command from the ISUP), or CPG(Hold)/CPG(retrieve) (CPG: call progress from the ISUP). In addition the APP can be sent in an independent APM (APM: Application Transport message ITU-T Q.765) where it should be noted that this can possibly lead to a desynchronization.

After its receipt the A-side Media Gateway Controller MGC uses the H.225 protocol with a new information element, e.g. "recvonly" (receive only) in the CallHoldOperations (Section 12 of the ITU-T Recommendation H.450.4) in the FACILITY to prevent any further media stream being sent to the B-side SIP subscriber T1.

Alternatively the information elements already defined in H.450.4 can be reused, but with the additional request, that H.323 terminals must then implement the procedure that was previously optional as "mandatory".

When the B-side SIP subscriber T1 now wishes to accept the A-side H.323 subscriber T2 again, the SIP application again transmits its own IP address (or the attributes, see above). From this an Action Indicator is again made in the BICC which allows the sending of payload from A to B. In this case the APP may be sent in a BICC SUS/RES, or CPG (Hold)CPG(retrieve) or in addition in a self-contained APM (see above, if nec. duplication of the messages in successive interworkings BICC-SIP etc).

The A-side Media Gateway Controller MGC then uses the H.225 protocol with a new information element, e.g. "sendrecv" (receive only) in the CallHoldOperations in the FACILITY to have further media streams sent to the B-side SIP subscriber T1.

For the case in which the feature is to be initiated by the A-side H.323 subscriber T2 it is necessary for the H.323 subscriber T2 to definitely interrupt the sending of a payload stream. The interruption of this payload stream can alternatively also be performed in the intermediate Media Gateway MG or Media Gateway Controller MGC.

The scenario depicted is only one example. Basically the other direction (A-side SIP subscriber T1 sends re-INVITE) is allowed.

Figure 5B:
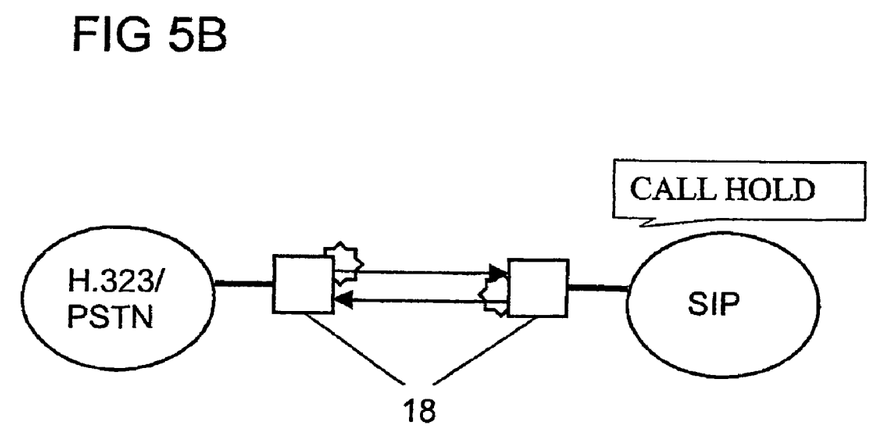

In general, as shown in FIG. 5b, a command set is output to the second subscriber, an H.323 subscriber T2 (or in the first embodiment a PSTN subscriber T2) who interrupts the send direction of the payload channel 12 (as regards the second subscriber and in the direction of the first subscriber T1), so that the user channel 12 involved is interrupted both in the send and in the receive direction for the time during which use is being made of the service feature 16.

In the first embodiment (SIP subscriber and PSTN subscriber) hiQ9200 are preferably used as Media Gateway Controllers MGC—also known as feature servers or media nodes—for the transfer and processing of the signaling. For the transfer of the payload channels between different types of network such as for example the well-proven circuit switched telephone networks (also called Time Division Multiplexing (TDM) networks) or packet switched data networks (also called IP networks when the well known Internet protocol (IP) is used) hiG1000 are also used as Media Gateways.

These Gateway Controllers MGC can also be arranged between different packet-oriented data networks, in which for example the protocols of the SIP family or the H.323 family are used.

This requires communication between the Media Gateway Controllers MGC which is performed in accordance with the rules of the appropriate protocol.

For MGC-MGC communication a protocol in accordance with the ITU-T Standard Q.1902.x BICC CS2 (Bearer Independent Call Control—Capability Set 2) can be used, in which for example RTP describes as the bearer technology with a separate service indicator for the MTP (message transfer part) and Q765.5 BAT (Bearer Application Transport) for IP payload channels (Bearer) how for the disconnection of the call and bearer their familiar service features 16 or In services are to be made available to the end customer in the telecommunications network. Any protocols that operate in the same way, such as ISUP+, can however be provided.

As regards the first embodiment of this invention (gateway: PSTN/IP network) a protocol corresponding to the MGCP (Media Gateway Control Protocol) standard, the ITU-T Standard H.248 or any other protocol which operates in the same way can be used for MGC-MG communication.

The aim of interworking between the protocols in accordance with the invention:

ISUP, BICC and SIP, in accordance with the first embodiment and

H.323, BICC and SIP, in accordance with the second embodiment is that both the subscriber T2 and also the SIP subscriber T1 can be offered or should be able to be offered the known ISDN service features 16 (also called features or services). In this case the previously known procedure "Call Hold/3PTY Service" ("3PTY Service" means Three Party Service here, in which a subscriber can speak to two further partner subscribers in the sense of a conference call), in which dependent partners are put on hold, should be made available to an SIP subscriber T1 for use of a BICC MGC-MGC communication. The same method can for example also be employed with the Terminal Portability Service. The common factor with both services is that a disconnection of the user channel is required to use them.

The problem here is that the in the prior art is that in the traffic between two PSTN, especially TDM subscribers, the service feature 16 can be processed automatically, which is not possible in the traffic between an SIP-based subscriber and a PSTN subscriber.

As explained above for the prior art and with reference to FIG. 5a, for traffic between PSTN subscribers the payload channel or bearer is disconnected for both directions in the exchange 18 of that subscriber by whom the service feature 16 was requested.

For traffic between SIP subscribers T1 there is provision for the SIP subscriber T1 in the case of Call Hold to interrupt the payload channel 12 to the partner subscriber T2 for the own send direction locally, but not for the own receive direction (that is the send direction of the remote partners) at there own location (i.e. locally), but to notify the remote subscriber to interrupt the send direction there (for more information see IETF draft 2543 to -04 Chapter B.4.4 or Draft ietf-mmusic-sdp-offer-answer-02 Chapter 8.4.).

Thus, previously for interworking between a PSTN subscriber on the one side and an SIP subscriber T1 on the other side only the PSTN subscriber could request service feature 16, because the outgoing payload channel 12 from SIP subscriber T1 could be put on hold in the switching center 18 of the PSTN subscriber. Conversely (SIP subscriber T1 requests Call Hold) however, the outgoing payload channel 12 from the PSTN subscriber could not be put on hold, since the existing exchange 18 of the PSTN network N2 does not receive the notification sent out by the SIP subscriber T1 and also cannot process it. Thus service feature 16 in accordance with the prior art could not be executed if it were initiated by an SIP subscriber T1 in interworking with a PSTN subscriber.

Likewise service feature 16 according to the prior art could not be executed if it was initiated by an SIP subscriber T1 in interworking with an H.323 subscriber T2.

In other words the invention lies in a method for providing at least one (additional) service feature 16 at a first terminal which is arranged for telecommunication in a digital network with a second terminal, in which the first terminal is implemented in accordance with a first protocol P1 and the second terminal in accordance with a second protocol P2 and where the two protocols P1, P2 are arranged for interworking and in which the network includes at least one signaling channel 10 and at least one payload channel 12 and in which the control data is transmitted separately from the payload channel data and its payload data transmission is at least partly IP-based" and in which the service feature 16 requires a disconnection of the relevant user channel 12 in the send and receive direction, characterized in that the first protocol P1 is arranged for an SIP-based network and the second protocol P2 is a protocol in accordance with the H.323 Standard or the second subscriber is an ISDN subscriber, in that the control of the first terminal is modified to the extent that the H.323 terminal (in the other embodiment: the PSTN terminal) uses a newly introduced set of commands to interrupt the sending of its payload (local). This is achieved by providing a non-local disconnection of the relevant payload channel 12 in the receive direction in respect of the first subscriber T1.

In this case the term "local disconnection" means a disconnection of the user channel 12 in a local switching center 18 in relation to the relevant subscriber. With the method proposed here the service features Call Hold and Terminal Portability could also be provided for an SIP subscriber T1 both in interworking to a PSTN subscriber or the ISUP protocol and also to an H.323 subscriber The method is advantageously applicable to both cases in which the service feature 16 is initiated from the first subscriber T1 and for cases in which the service feature 16 is initiated by the second subscriber T2.

The additional service features 16 provided relate in the preferred embodiment to features which are available in any event in networks which are organized in accordance with Time-Division Multiplexing (TDM), preferably "Call Hold" or "Terminal Portability".

Advantageously the proposed solution makes it possible for the dependent (H.323 or PSTN) subscriber T2 to actually interrupt the transmission of his payload in the direction of SIP subscriber T1.

The interruption in accordance with the invention occurs either in the Terminal 14 of the H.323 subscriber T2 himself or at a gateway between PSTN/IP network via a Media Gateway MG in connection with a Media Gateway Controller MGC which is assigned to the terminal 14 and is arranged between the terminal 14 and the SIP subscriber (or terminal). This has the advantage that the terminal 14 can remain unchanged.

Unlike use in existing switching technology which currently already has the option of putting the remote subscriber on hold locally for the transmit and receive direction, this can in accordance with the invention also be performed in the case of an H.323/ISUP-BICC-SIP interworking in the Media Gateway MG at least for the send direction of the H.323 subscriber.

Advantageously this does not conflict with the SIP Draft Standard.

Furthermore a method is provided which enables the operator to also offer these features in an H.323-ISUP-SIP network with interworking to BICC or with a functionally equivalent interworking without restriction.

Also no adaptation of the existing infrastructure, especially the switching centers 18 of the networks N1 or N2, is necessary.

It should be stressed that instead of SIP, any other protocol which operates in the same way can be employed, such as SIP-T (SIP-T is a protocol, which is based on SIP to simplify the interworking of PSTN and SIP) and also instead of BICC alternate protocols, such as. ISUP+.

For checking the remote MGC the ITU-T protocol Q.765.5 is for example preferably expanded by the following value of the Action Indicator:

1110 0000 recvonly;
1110 0001 sendrecv;

recvonly: indication that IP packets are only allowed to be received sendrecv: indication that IP packets are allowed to be received and sent For control of the remote H.323 subscriber T2 the protocol Q.765.5 expanded in this way (see above) is further mapped in accordance with the following specification to new H.225 (ITU-T Recommendation, H.323 Call signals) information elements in accordance with the invention. This mapping in this case takes precedence over the specification which is described in H.245 Annex C (Interworking ISUP on H.323) Section C.6.2.8 Call Hold.

| Mapping of SIP (via BICC) to H.323 | | Mapping of SIP (via BICC) to H.323 (Alternate)(optional procedure mandatory) | |
|---|---|---|---|
| BICC | H.323(H223) | BICC | H.323(H.225) |
| CPG/S US/RES APP | FACILITY | CPG/S US/RES APP | FACILITY |
| Action indicator | Call Hold Operation (new) | Action indicator | CaliHoldOperation (old) |
| 1110 0000 recvonly | recvonly | 1110 0000 recvonly | HoldNotific |
| 1110 0001 sendrecv | sendrecv | 1110 0001 sendrecv | HoldRetrieve | with
recvonly: indication that IP packets are only allowed to be received
sendrecv: indication that IP packets are allowed to be received and sent In the two preferred embodiments of the invention this relates to an interworking of the protocols H.323/ISUP/BICC/SIP. However network configurations allowing direct interworking between ISUP or H.323 and SIP, without BICC interface are also allowed, for example via an internal application of the method described here within the switching center or the Media Gateway Controller MGC.

As a result of the plurality of network access protocols it makes sense to convert the relevant signaling system of the subscriber into a standardized signaling system, e.g. V5, to employ a uniform system with regard to the transfer.

Therefore in alternate embodiments of the invention, instead of the Media Gateways MG (as in the example) an IAD (integrated access device),an MTA (multimedia terminal adaptor) and/or an interactive voice output (IVR, VoDSL, VoCable) of a Media Gateway Controller MGC could be employed when receiving the new Action Indicator to suppress the send direction.

Finally it should be stressed that the description is not to be seen as basically restricting the components relevant for the invention. For a relevant expert it is especially evident that terms such as 'Gateway' or 'Gateway Controller' are to be understood functionally and not physically. Thus they can also be realized for example partly or completely in software and/or distributed over a number of physical devices. Also in the case in which both subscribers (SIP and H.323) are connected to one CFS the execution sequences described above and the associated mapping are executed internally in the CFS.

The invention claimed is:

1. A method for interworking between protocols, in a digital, multimedia communication network, the network comprising:
   a first subscriber;
   a second subscriber;
   a connection between the first subscriber and the second subscriber, the connection having a payload channel, the payload channel including a send direction and a receive direction, the receive direction being from the first subscriber to the second subscriber, and the send direction being from the second subscriber to the first subscriber;
   at least one service feature which requires a disconnection of the payload channel in the send direction and the receive direction;
   a first protocol, with which the first subscriber operates, designed for signaling in at least one of a packet-oriented network and an IP-based network, and only provides a first local disconnection of the payload channel in the send direction for the at least one service feature; and
   a second protocol, with which the second subscriber operates, providing at least the option of a second local disconnection of the payload channel in the receive direction, the method comprising:
      providing the first subscriber with the at least one service feature by controlling the second subscriber during use of the at least one service feature, so that a transmission in the receive direction to the first subscriber is interrupted.

2. The method according to claim 1, wherein the transmission includes a media stream.

3. The method according to claim 1, wherein the at least one service feature is at least one of "Call Hold" and "Terminal Portability".

4. The method according to claim 1, wherein the network further comprises a protocol converter arranged between the first protocol and the second protocol, and the payload channel includes separate channels, including a first separate channel for the send direction and a second separate channel for the receive direction, the method further comprising:
   providing a notification in the send direction to the second subscriber by the first subscriber, while performing the at least one service feature, for interrupting the second separate channel originated from the second subscriber;
   informing the protocol converter that the notification was sent out by the first subscriber; and
   interrupting the second separate channel originated from the second subscriber by the protocol converter.

5. The method according to claim 1, wherein the network further comprises a Media Gateway arranged between the first protocol and the second protocol, and the second subscriber is a PSTN subscriber, the method further comprising:
   outputting a command in the send direction to the second subscriber for interrupting the payload channel in the receive direction originated from the second subscriber, while performing the service feature by the first subscriber, wherein the command initiates the following events:
   receiving a notification regarding a sender of the command by the Media Gateway; and
   interrupting the payload channel in the receive direction originated from the second subscriber by the Media Gateway.

6. The method according to claim 5, wherein the Media Gateway interrupts the payload channel in the receive direction originated from the second subscriber one of indirectly and directly.

7. The method according to claim 5, wherein the network further includes a Media Gateway Controller assigned to the Media Gateway for processing the command indirectly.

8. The method according to claim 5, wherein, if the second subscriber is at least one of an analog subscriber, an ISDN subscriber, and the Media Gateway, at least one of an Integrated Access Device (IAD), a Multimedia Terminal Adaptor (MTA), and an Interactive Voice Response (IVR) is provided to merge all data traffic of the second subscriber and send the data traffic to a switching center.

9. The method according to claim 1, wherein the communication between the first protocol and the second protocol is effected by a third protocol.

10. The method according to claim 9, wherein the third protocol is at least one of a BICC CS2 protocol and an ISUP+ protocol.

11. The method according to claim 1, wherein the second subscriber not initiating the at least one service feature is informed of at least one of the execution of the at least one service feature and the interruption on the second subscriber's terminal.

12. The method according to claim 1, wherein the second protocol includes a command set, by which the payload channel in the receive direction can be interrupted non-locally in respect of the first subscriber.

13. The method according to claim 1, wherein, if the second protocol, is an 11.323 protocol, the interruption is effected in the terminal of the second subscriber.

14. The method according to claim 13, wherein a notification is received by a protocol converter assigned to the second subscriber, the second subscriber being issued a command to interrupt an outgoing payload channel from the second subscriber.

15. The method according to claim 1, wherein the method is performed by a computer program product designed for execution on at least one processor.

16. A device for performing interworkings of a first protocol of a first subscriber with a second protocol of a second subscriber of a digital, multimedia communications network, comprising:

at least one payload channel between the two subscribers, the payload channel including a send direction and a receive direction, wherein the first protocol is arranged for signaling in at least one of a packet-oriented network and an IP-based network and which, for service features which require a disconnection of the at least one payload channel, only provides for a first local disconnection of the at least one payload channel in the send direction and wherein the second protocol is for service features which require a disconnection of the payload channel and provides at least the option of a second local disconnection of the at least one payload channel in the receive direction; and mechanisms which provide the first subscriber with a set of service features by modifying the control of the second subscriber such that a transmission in the receive direction is interrupted.

17. The device according to claim 16, wherein the device is at least one of a protocol converter, a Media Gateway Controller, a Media Gateway, and a terminal of the second subscriber.

18. The device according to claim 16, wherein the service features provided by the mechanisms require a disconnection of the at least one payload channel in the send direction and the receive direction.

19. The device according to claim 16, wherein the transmission includes a media stream.

20. An arrangement comprising:

a first network which is at least one packet-oriented and IP-based and to which a first subscriber is connected, the first subscriber accessing a first protocol which is arranged for signaling in at least one of a packet-oriented network and an IP-based network, for providing service features which require a call disconnection of a payload channel, and which only provide for a first local disconnection of the payload channel in a send direction; and a second network, to which a second subscriber is connected, the second subscriber accessing a second protocol which for service features which require a disconnection of the payload channel, provides an option of a second local disconnection of the payload channel in a receive direction, wherein the arrangement provides the first subscriber with a set of service features which require a disconnection of the payload channel in the send direction and the receive direction by modifying control of the second subscriber to interrupt a transmission in the receive direction of the payload channel.

21. The arrangement according to claim 20, wherein the arrangement is a multimedia communications network.

* * * * *